(12) United States Patent
Stevens

(10) Patent No.: US 7,793,751 B2
(45) Date of Patent: Sep. 14, 2010

(54) VEHICLES INCLUDING CONTROL ASSEMBLIES HAVING ROTATABLE CONTROL KNOBS

(75) Inventor: Eric Stevens, Columbus, OH (US)

(73) Assignee: Honda Motor Company, Ltd., Tokyo (JP)

( * ) Notice: Subject to any disclaimer, the term of this patent is extended or adjusted under 35 U.S.C. 154(b) by 1115 days.

(21) Appl. No.: 11/097,710

(22) Filed: Apr. 1, 2005

(65) Prior Publication Data

US 2006/0219464 A1    Oct. 5, 2006

(51) Int. Cl.
*B60K 23/00* (2006.01)
*F16C 1/10* (2006.01)

(52) U.S. Cl. .................... 180/336; 74/502.2
(58) Field of Classification Search ............... 180/336; 74/502.2

See application file for complete search history.

(56) References Cited

U.S. PATENT DOCUMENTS

| | | | |
|---|---|---|---|
| 2,874,587 A | 2/1959 | Schmid | |
| 3,194,335 A | 7/1965 | Yue | |
| 3,728,909 A | 4/1973 | Jespersen | |
| 3,746,118 A | 7/1973 | Altorfer | |
| 3,998,110 A | 12/1976 | O'Brien et al. | |
| 4,005,611 A * | 2/1977 | Jeffries | 74/416 |
| 4,191,065 A | 3/1980 | Golobay et al. | |
| 4,286,699 A | 9/1981 | Pawelka | |
| 4,328,712 A | 5/1982 | Osborn | |
| 4,497,220 A * | 2/1985 | Grinde | 475/298 |
| 4,607,733 A | 8/1986 | Dodge | |
| 4,620,453 A | 11/1986 | Kumazawa | |
| 4,624,350 A | 11/1986 | Akashi | |
| 4,638,678 A | 1/1987 | Gorman et al. | |
| 4,655,309 A | 4/1987 | Imaizumi et al. | |
| 4,662,235 A | 5/1987 | Kobayashi | |
| 4,706,514 A | 11/1987 | Schmidt | |
| 4,735,105 A | 4/1988 | Kumazawa | |
| 4,738,153 A | 4/1988 | Sabel | |
| 4,781,074 A | 11/1988 | Long | |

(Continued)

FOREIGN PATENT DOCUMENTS

DE    41 19275    11/1992

OTHER PUBLICATIONS

US2002/0124680 A1, Sjodin, Sep. 12, 2002.

(Continued)

*Primary Examiner*—Lesley Morris
*Assistant Examiner*—Daniel Yeagley
(74) *Attorney, Agent, or Firm*—Ulmer & Berne LLP

(57) ABSTRACT

An all terrain vehicle includes a frame and a control assembly that can be directly or indirectly attached to the frame. The control assembly includes a control knob which can be readily accessible to an operator during operation of the all terrain vehicle. The control knob has a rotational axis that can be substantially parallel to the rotational axis of a driven wheel of the all terrain vehicle. The control assembly can be connected with a cable to a transmission of the all terrain vehicle such that the control knob can be rotatable to disable a reverse inhibitor system of the transmission. The control assembly can further include a shaft having a first stop and a base having a second stop, such that the first and second stops can be configured to selectively contact each other during rotation of the control knob.

11 Claims, 9 Drawing Sheets

U.S. PATENT DOCUMENTS

| | | | |
|---|---|---|---|
| 5,038,881 A * | 8/1991 | Wysocki et al. | 180/184 |
| 5,134,897 A | 8/1992 | Romano | |
| 5,144,854 A | 9/1992 | Herzog et al. | |
| 5,289,734 A | 3/1994 | Parsons | |
| 5,577,413 A | 11/1996 | Tagawa et al. | |
| 5,622,083 A * | 4/1997 | Kirimoto et al. | 74/473.21 |
| D404,014 S | 1/1999 | Barnard et al. | |
| D409,558 S | 5/1999 | Lundgren | |
| 5,992,552 A * | 11/1999 | Eto | 180/190 |
| 6,012,351 A | 1/2000 | Ysker | |
| 6,076,416 A | 6/2000 | Sputhe | |
| 6,092,435 A | 7/2000 | Paparoni | |
| 6,167,774 B1 | 1/2001 | Gagnon et al. | |
| 6,186,263 B1 * | 2/2001 | Takano | 180/336 |
| D438,846 S | 3/2001 | Bonn | |
| 6,367,347 B1 * | 4/2002 | Blaschke et al. | 74/502.2 |
| 6,499,236 B2 | 12/2002 | Yoshida et al. | 37/219 |
| 6,550,564 B2 * | 4/2003 | Inoue et al. | 180/336 |
| 6,553,861 B2 * | 4/2003 | Ose | 74/502.2 |
| 6,588,537 B2 | 7/2003 | Rioux et al. | |
| 6,619,754 B1 | 9/2003 | Dombek et al. | |
| 6,622,806 B1 * | 9/2003 | Matsuura | 180/68.1 |
| 6,658,958 B2 | 12/2003 | Day et al. | |
| 6,658,965 B2 | 12/2003 | Allen | |
| 6,694,836 B2 * | 2/2004 | Kawamoto et al. | 74/371 |
| 6,725,962 B1 * | 4/2004 | Fukuda | 180/292 |
| 7,147,076 B2 * | 12/2006 | Izumi | 180/250 |
| 7,150,341 B2 * | 12/2006 | Maeda et al. | 180/336 |
| 7,328,757 B2 * | 2/2008 | Davies | 175/113 |
| 7,367,420 B1 * | 5/2008 | Sherrod et al. | 180/336 |
| 7,607,368 B2 * | 10/2009 | Takahashi et al. | 74/501.6 |
| 2004/0093974 A1 * | 5/2004 | Nesseth | 74/473.12 |

OTHER PUBLICATIONS

US2003/0136215 A1, Allen, Jul. 24, 2003.

* cited by examiner

VEHICLES INCLUDING CONTROL ASSEMBLIES HAVING ROTATABLE CONTROL KNOBS

TECHNICAL FIELD

The present invention relates to vehicles, particularly all terrain vehicles, that include control assemblies having rotatable control knobs.

BACKGROUND OF THE INVENTION

Many all terrain vehicles ("ATV's") include a transmission having a reverse gear as well as a reverse inhibitor system. A reverse inhibitor system prevents an operator from using a gear shift control to select the reverse gear unless or until the operator also actuates an independent control device. Such a system helps to prevent an operator from inadvertently shifting an ATV into reverse gear, as such inadvertent shifting could result in injury to the operator of the ATV.

The independent control device, when actuated by an operator, disables the reverse inhibitor system, thereby enabling the operator to engage the reverse gear using the gear shift control to facilitate reverse operation of the ATV. On conventional ATV's, independent control devices coupled with reverse inhibitor systems are often positioned and/or configured such that their actuation requires complex action by an operator. For example, some ATV's include independent control devices in the form of round rotatable control knobs that are mounted such that their rotational axis is directed substantially toward the operator of the ATV. Actuation of such control knobs can be difficult, however, as the use of multiple fingers can be required of an operator. Other conventional independent control device configurations can also present unacceptable actuation difficulties to an operator, particularly when an operator is wearing gloves and/or when ambient light is low.

SUMMARY OF THE INVENTION

The present invention is directed to ATV's including a control assembly having a rotatable control knob. One embodiment of the present invention involves an ATV that comprises a frame. A transmission is attached to the frame and includes a reverse inhibitor system. At least one driven wheel is operatively coupled with the transmission and has a first rotational axis. The ATV further includes a control assembly which comprises a control knob having a second rotational axis that is substantially parallel to the first rotational axis. The control knob is readily accessible to an operator during operation of the ATV. A cable connects the control assembly with the transmission. The control knob is rotatable to disable the reverse inhibitor system.

In accordance with another exemplary embodiment of the present invention, an ATV is provided that comprises a frame and a body panel attached to the frame. A transmission is attached to the frame and includes a reverse inhibitor system. The ATV further includes a control assembly which comprises a control knob having a rotational axis. The control assembly is attached directly to the frame and the control knob is readily accessible to an operator during operation of the ATV. A cable connects the control assembly with the transmission. The control knob is rotatable to disable the reverse inhibitor system.

In accordance with yet another exemplary embodiment of the present invention, an ATV is provided that comprises a frame. At least one driven wheel is supported with respect to the frame and has a first rotational axis. The ATV further includes a control assembly which comprises a control knob, a shaft, and a base. The control knob is fixedly attached to the shaft and the shaft is rotatably attached to the base. The control knob has a first stop and the base has a second stop. The first and second stops are configured to selectively contact each other during rotation of the control knob in a first direction with respect to the base to limit rotation of the control knob with respect to the base in the first direction.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF EXEMPLARY EMBODIMENTS

Figure 1:
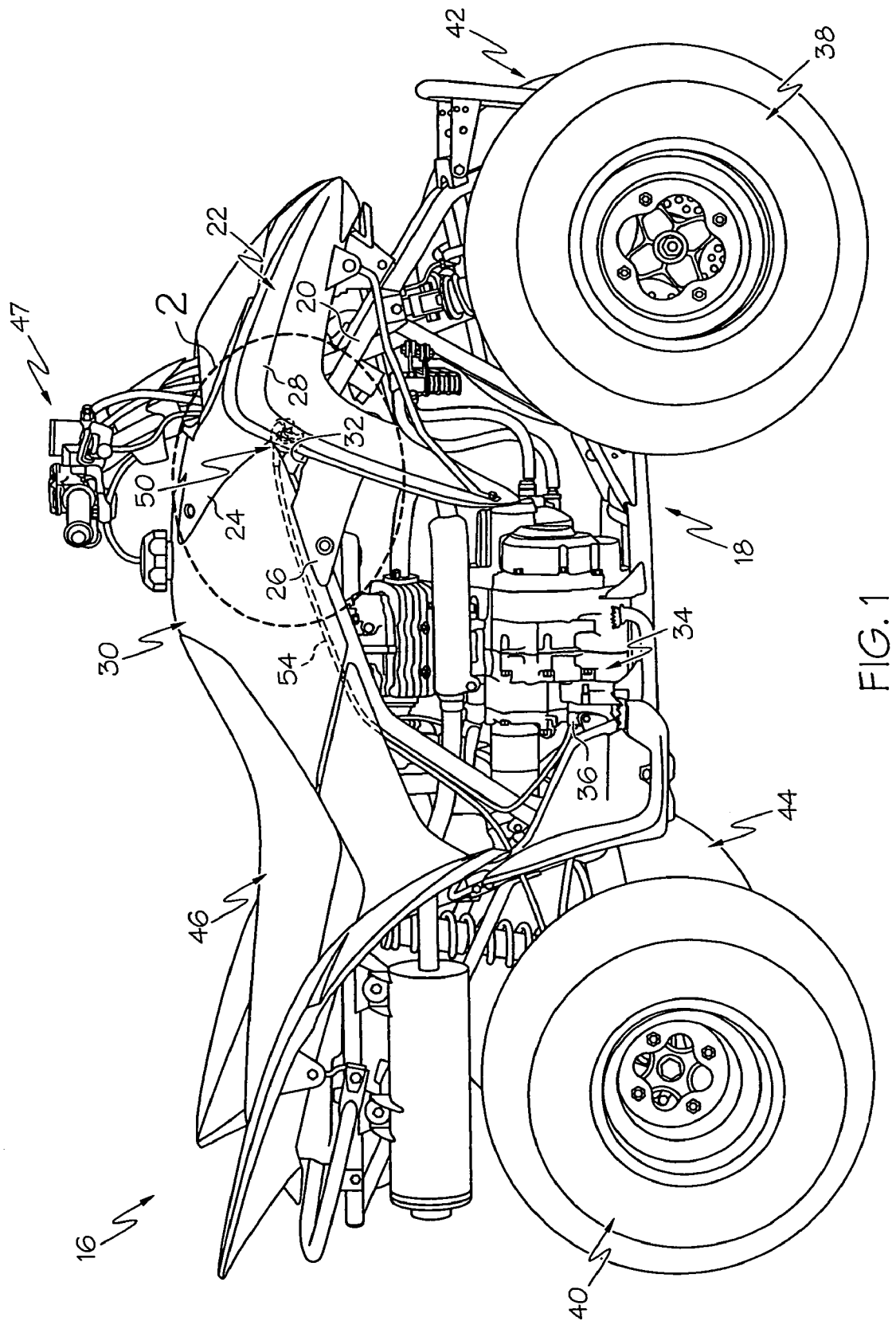
FIG. 1 is a side perspective view of an ATV equipped with a control assembly in accordance with one exemplary embodiment of the present invention.
Figure 2:
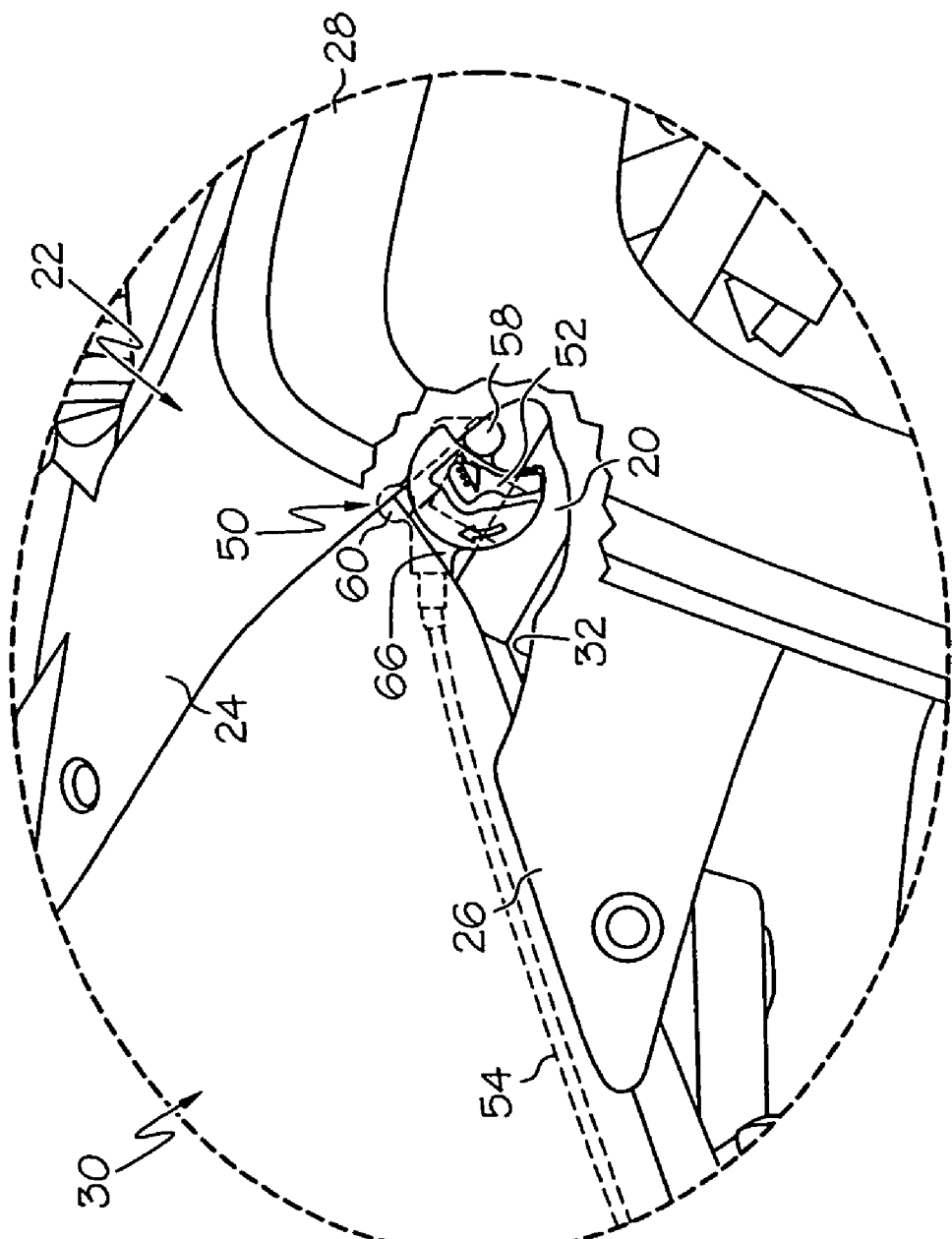
FIG. 2 is an enlarged side perspective view of a portion of the ATV of FIG. 1, wherein a portion of the fender has been broken out so that the control assembly could be more clearly depicted.
Figure 3:
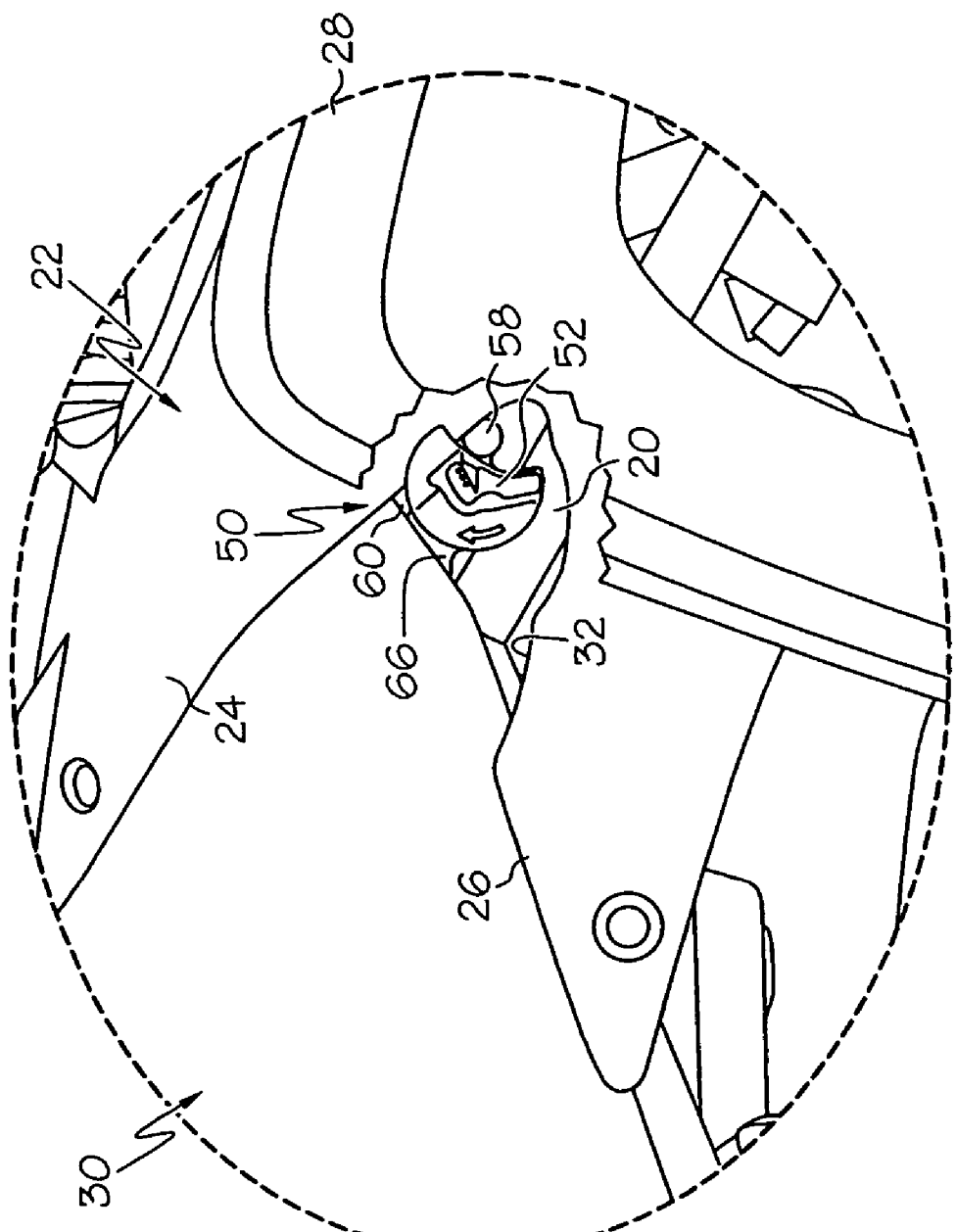
FIG. 3 depicts the same view as FIG. 2 except that certain hidden lines have been removed for clarity.

The present invention and its operation are hereinafter described in detail in connection with the views and examples of FIGS. 1-9, wherein like numbers indicate the same or corresponding elements throughout the views. These embodiments are shown and described only for purposes of illustrating examples of elements of the invention, and should not be considered as limiting on alternative structures or assemblies that will be apparent to those of ordinary skill in the art. Referring to FIG. 1, an exemplary ATV 16 is shown to include a frame 18. The ATV 16 also includes a seat 46 and handlebars 47 for interaction with an operator.

The ATV 16 is also shown to include a transmission 34 which is directly or indirectly attached to the frame 18 and which includes a reverse inhibitor system 36. It is generally noted that use of the term "attached" within the present description refers to both direct attachment of described elements and indirect attachment of described elements, wherein indirect attachment involves one or more additional elements therebetween. The ATV 16 also includes at least one wheel for engaging the ground surface upon which the ATV 16 is traveling. In particular, the ATV 16 depicted in FIG. 1 is shown to include a front right wheel 38, a rear right wheel 40, a front left wheel 42, and a rear left wheel 44. One or more of the wheels 38, 40, 42, 44 can be operatively coupled or connected with the transmission 34 and can be supported with respect to the frame 18. Those wheels (e.g., 38, 40, 42, 44) which are operatively coupled with the transmission 34 can be driven thereby to facilitate travel of the ATV 16 along the ground. In one particular example, the rear wheels 40, 44 can be operatively coupled to the transmission 34 such that they can rotate to facilitate motion of the ATV 16 with respect to the ground. In another embodiment, the front wheels 38, 42 might also be selectively operatively coupled to the transmission 36 to assist the rear wheels 40, 44 in facilitating travel of the ATV 16 along the ground, hence providing four-wheel drive or all-wheel drive capability.

An ATV can also include one or more body panels that are attached with respect to the frame. For example, multiple body panels are shown in FIG. 1 as being attached with respect to the frame 18. For example, a first body panel 22 is shown to be attached to the frame 18 and is shown to include a top portion 24, a bottom portion 26, and a fender portion 28. Other body panels (e.g., a second body panel 30) may also be attached to the frame 18. It should be appreciated that the body panels (e.g., 22, 30) can either be directly attached to the frame 18 and/or can be indirectly attached to the frame (e.g., via brackets or other components).

An ATV can also include a control assembly. For example, the ATV 16 is shown in FIG. 1 to include a control assembly 50 which connects to the reverse inhibitor system 36 with a cable 54 (e.g., a mechanical link). The control assembly 50 is shown to at least partially protrude through an opening 32 defined by the first and second body panels 22, 30. As can be seen more clearly in FIGS. 2-4, the control assembly 50 can be attached to a frame portion 20 of the frame 18, and can include a control knob 52 which can be readily accessible to an operator of the ATV 16. A readily accessible control knob can be configured upon an ATV such that an operator can easily locate and actuate the control knob during use of the ATV without significantly distracting the operator from other aspects of controlling the ATV. While one exemplary disposition of the control assembly 50 can be best seen in FIGS. 2-3, it should be appreciated that the control assembly 50 could alternatively be located and/or configured elsewhere upon an ATV. For example, the control assembly 50 can be located and configured upon the ATV 16 such that the control knob 52 is not likely to be inadvertently contacted or rotated by the operator and/or debris during operation of the ATV 16.

Figure 4:
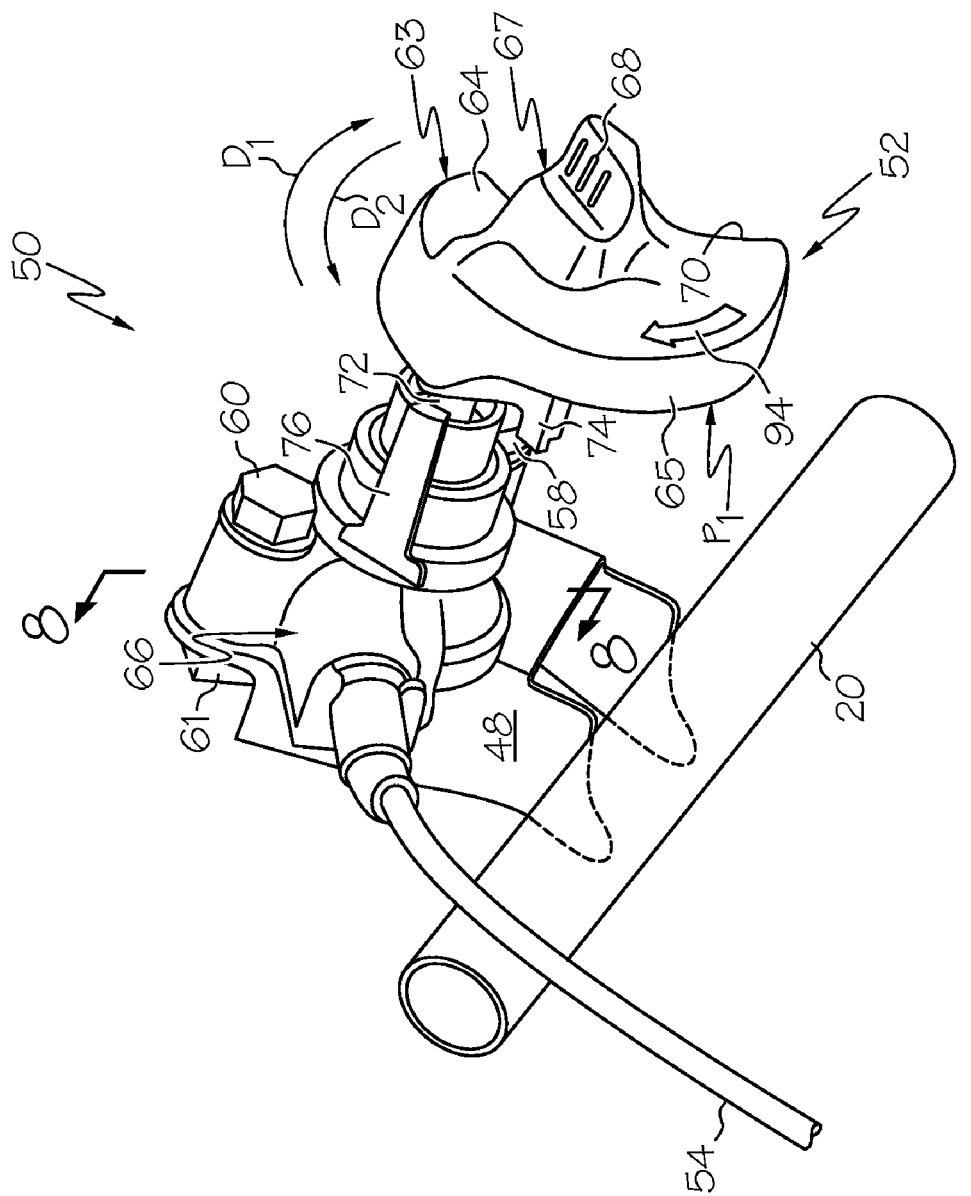
FIG. 4 is an enlarged perspective view of the control assembly attached to the frame of the ATV of FIGS. 1-3, wherein body panels of the ATV have been removed for clarity.

Referring now to FIG. 4, the control assembly 50 is shown to include the control knob 52, a shaft 72 and a base 66. The base 66 is shown to be directly attached to a bracket 48, and the bracket 48 is shown to be directly attached to the frame portion 20. In this configuration, the control assembly 50 is indirectly attached to the frame portion 20 (and hence the frame 18) of the ATV 16. Bolts 58, 60 and nuts (e.g., nut 61) can facilitate the direct attachment of the base 66 to the bracket 48, although it should be appreciated that any of a variety of other fasteners and/or mechanical arrangements can be used to facilitate this direct attachment. The bracket 48 can be glued, welded, bolted, and/or otherwise directly attached to the frame portion 20.

Still referring to FIG. 4, the control knob 52 can include a protruding portion 67, which can include a thumb rest 68, can also include a finger pad 63. The control knob 52 can protrude beyond the body panels (e.g., 22, 30) of the ATV 16 such that the control knob 52 is readily locatable and accessible by an operator during operation of the ATV 16. The finger pad 63 can include a generally outwardly facing surface 64 that can face generally away from ATV 16. Finger pad 63 can also include an edge surface 65 that is contiguous with the generally outwardly facing surface 64 and that defines a perimeter $P_1$ of finger pad 63. The protruding portion 67 can be integral with the finger pad 63 and can extend outwardly from the generally outwardly facing surface 64 of finger pad 63. The edge surface 65 can include a finger contact portion 70. The control knob 52 can be configured for rotation in the $D_1$ direction when pressure is applied to the finger contact portion 70 by one or more fingers (e.g., a single finger such as a ring finger or index finger) of an operator. By rotating the control knob in the $D_1$ direction, the reverse inhibitor system 36 within the transmission 34 can be disabled, thereby enabling the ATV 16 to be driven in the reverse direction. The thumb rest 68 can be provided to enable an operator to quickly orient his or her hand with respect to the control knob 52 in order that he or she can quickly locate a finger (e.g., an index finger) upon the finger contact portion 70 to facilitate rotation of the control knob 52 in the $D_1$ direction. Indicia might be associated with the control knob to inform an operator as to the function of the control knob and/or as to which direction is the $D_1$ direction. For example, as depicted in FIG. 4, an arrow 94 can be painted, stamped, labeled, and/or can be otherwise provided on the control knob 52 for identifying the $D_1$ direction for an operator. Similar indicia might additionally or alternatively be provided on one or more of the body panels adjacent to the control knob 52.

The control knob 52 is shown in FIG. 4 to be fixedly attached with respect to the shaft 72. In one embodiment of the present invention, this fixed attachment might involve the use of adhesive and/or other fasteners in attaching the control knob 52 to the shaft 72, while in another embodiment, this fixed attachment might involve the shaft 72 being integrally provided (e.g., molded or machined from the same piece of material) with the control knob 52.

The shaft 72 can be rotatably attached to the base 66. In one exemplary embodiment of the present invention, the control assembly can be provided with an external stop arrangement. For example, as shown in FIG. 4, the control knob 52 can be provided with a first stop 74 and the base 66 can be provided with a second stop 76. The first and second stops 74, 76 can be configured to selectively contact each other during rotation of the control knob 52 in a first direction ($D_1$) with respect to the base 66 in order to limit rotation of the control knob 52 with respect to the base 66 in that direction. The stops 74, 76 are shown in FIG. 4 to be spaced radially outwardly from the shaft 72 in an external-type configuration (as opposed to being located within the base 66). Through use of such an external stop configuration, damage caused by excess rotation of the control knob 52 can be prevented from occurring to the control assembly 50 and/or other devices attached to the control assembly 50 (e.g., reverse inhibitor system 36). Also, this stop configuration can be particularly beneficial when the control knob 52 has an elongated (lever or trigger type) configuration (as shown in FIG. 4) which has a longer moment arm than a typical round control knob, and which can thus enable an operator to readily impart even more significant rotational torque upon the shaft 72 with respect to the base 66 than could be readily developed through use of a control knob having a round configuration.

In some circumstances, the first and second stops 74, 76 might also be configured to selectively contact each other during rotation of the control knob 52 in a second direction ($D_2$) with respect to the base 66, wherein the second direction ($D_2$) can be opposite from the first direction ($D_1$). In such an arrangement, the first and second stops 74, 76 can limit rotation of the control knob 52 with respect to the base 66 in both the first and second directions ($D_1$ and $D_2$). In an alternate embodiment, however, the base 66 might include an internal stop arrangement for limiting rotational travel of the control knob 52 in the second direction ($D_2$) with respect to the base 66. Such an internal stop arrangement is not likely to withstand as much rotational torque as could an external stop arrangement (e.g., involving the first and second stops 74, 76), but because it is likely that only minimal amounts of rotational torque will be encountered in the reverse direction ($D_2$), such an internal stop arrangement might be suitable for limiting rotational travel of the control knob 52 in this direction. In some exemplary configurations, however, an internal stop arrangement might effectively function to prevent excess rotational travel in both the first and second directions ($D_1$, $D_2$).

Figure 8:
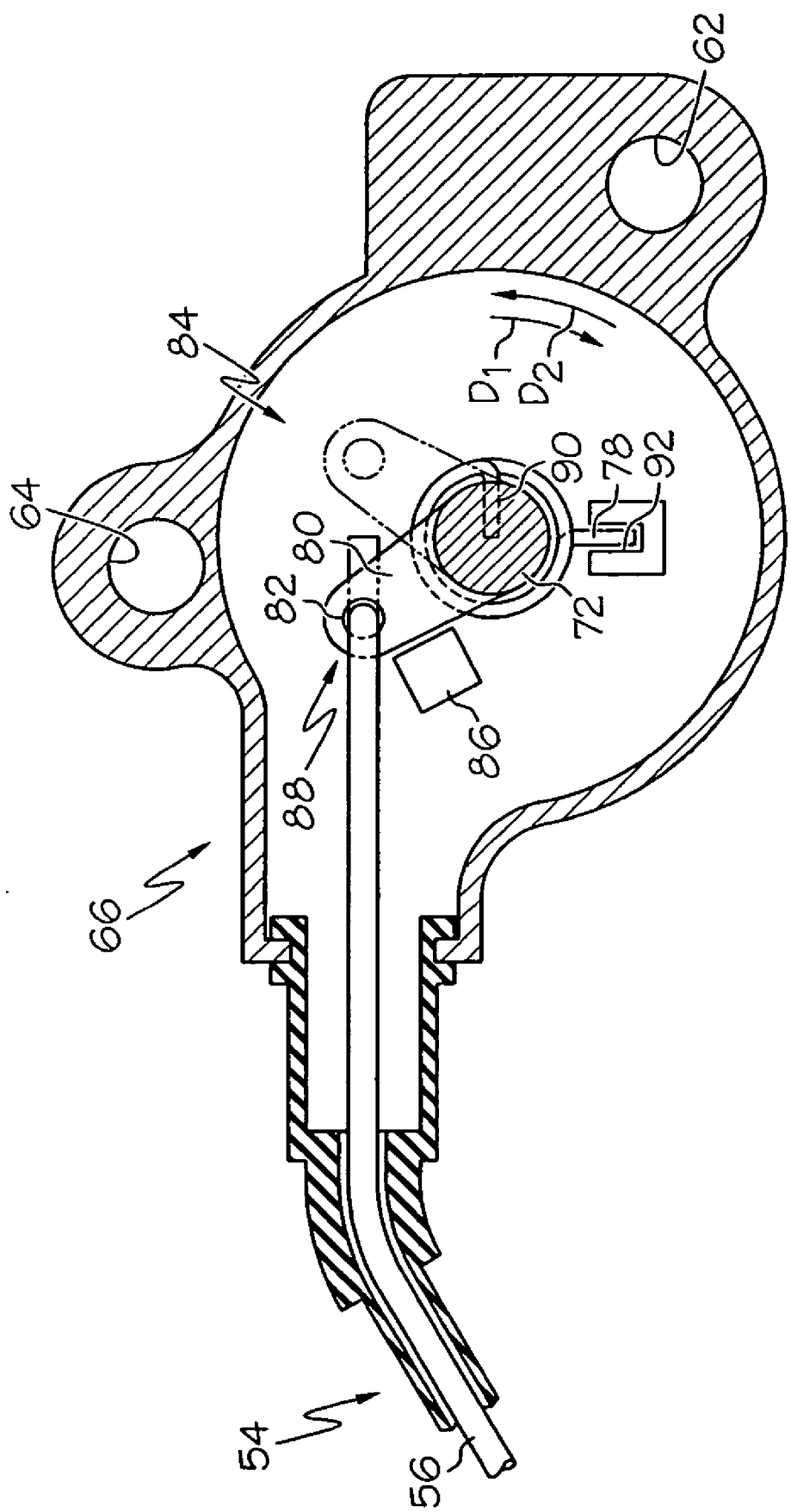
FIG. 8 is a cross-sectional view of the base and shaft of the control assembly taken along section lines 8-8 in FIG. 4.

FIG. 8 depicts an exemplary internal stop arrangement disposed within an internal cavity 84 of the base 66. The shaft 72 is shown to comprise a first member 80 disposed within the cavity 84, and the base 66 is shown to comprise a second member 86 disposed within the cavity 84. The cavity 84 can rotatably receive at least a portion of the shaft 72 such that the first member 80 can rotate within the cavity 84 during rotation of the control knob 52. The second member 86 can be fixed with respect to the base 66 such that it can selectively contact the first member 80 to prevent excess travel in the second direction ($D_2$) of the shaft 72 with respect to the base 66.

A spring might also be associated with the control assembly to facilitate return rotation of the control knob after its actuation by an operator. For example, a spring 78 is shown in FIG. 8 as being disposed within the cavity 84 and is shown to have a first end received within a first receptacle 90 provided in the shaft 72, and a second end received within a second receptacle 92 provided within the base 66. The shaft 72 (and hence the control knob 52 attached thereto) can be spring-biased in the second direction ($D_2$) with respect to the base 66 by the spring 78. It should be appreciated, however, that any of a variety of other springs and/or internal stop arrangements might be provided within the cavity 84. Spring biasing of the control knob 52 might additionally or alternatively be provided via the cable 54 by a spring mechanism within the reverse inhibitor system 36.

The rotational torque developed in the second direction ($D_2$) by the spring 78 can be significantly less than the torque that might be applied to the control knob 52 by an operator. Furthermore, it is unlikely that an operator would attempt to rotate the control knob 52 in the second direction ($D_2$) and, even if an operator did do so, the control knob could be shaped (e.g., as shown in FIG. 4) such that it is unlikely that an operator would exert as much torque upon the control knob in the second direction ($D_2$) as he or she would exert in the first direction ($D_1$). For these reasons, an internal stop arrangement, an example of which is depicted in FIG. 8, can be suitable for use in preventing excess rotational travel of the control knob 52 in the second direction ($D_2$), even though an internal stop arrangement may not in some circumstances be sufficiently strong to prevent excess rotational travel of the control knob 52 in the first direction ($D_1$).

The cavity 84 is shown to receive at least a portion of the shaft 72 including an interface 88 that is configured for connection with a mechanical link. In particular, the interface 88 is shown in FIG. 8 in the form of an aperture 82 provided within the first member 80 for receiving a moveable wire 56 from within the cable 54. As such, when the shaft 72 rotates, the first member 80 moves, thereby resulting in movement of the moveable wire 56. The base 66 is also shown to include apertures 62, 64 which can be used to receive fasteners (e.g., bolts 58, 60 shown in FIG. 4), for attaching the base 66 to the ATV 16.

Figure 9:
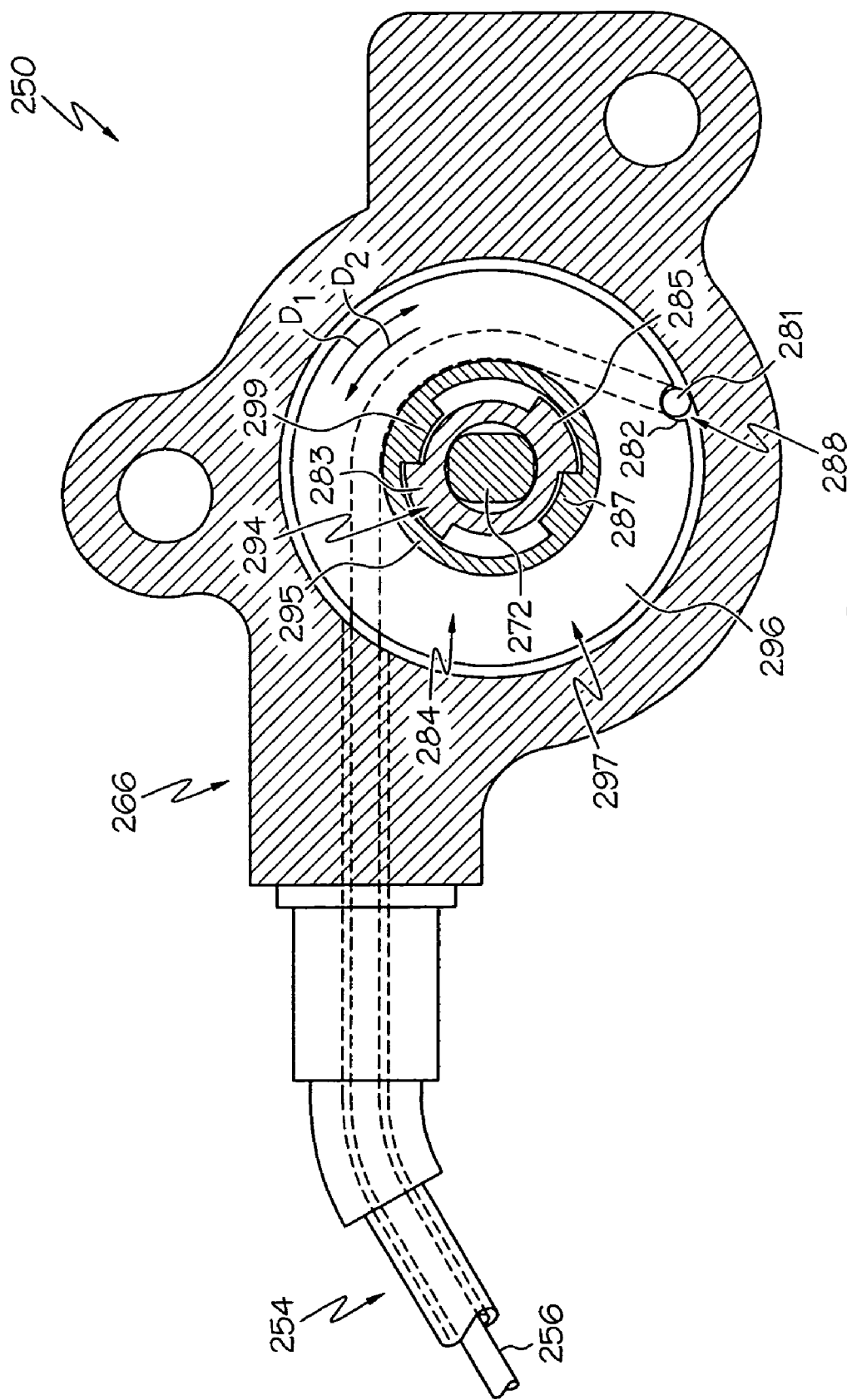
FIG. 9 is a cross-sectional view of a base and shaft of a control assembly in accordance with another exemplary embodiment of the present invention.

FIG. 9 depicts an alternate exemplary internal stop arrangement that might be disposed within an internal cavity 284 defined by a base 266 of a control assembly 250. In particular, a shaft 272 of the control assembly 250 can be coupled with a drum 297 such that both the shaft 272 and the drum 297 can rotate together within the cavity 284. The drum 297 is shown to include an outer portion 296 and an inner portion 295 that can be fixedly coupled or integrally formed together. The outer portion 296 is shown to include an interface 288 including a recess 282 for receiving an end 281 of a moveable wire 256. When the shaft 272 rotates, the drum 297 correspondingly rotates, and the moveable wire 256 is accordingly moved. The moveable wire 256 can be routed within a cable 254 to a controlled device, such as a reverse inhibitor system associated with an ATV's transmission.

The inner portion 295 of the drum 297 is shown to comprise two first members 287, 299, although fewer or greater first members might alternatively be provided. A central portion 294 can be fixed with respect to the base 266 and can be disposed within the cavity 284. The central portion 294 is shown to include two second members 283, 285, although fewer or greater second members might alternatively be provided. When the shaft 272 is rotated within the cavity 284 (e.g., during rotation of a control knob attached to the shaft 272), the first members 287, 299 can selectively contact the second members 283, 285, thereby preventing excess travel of the shaft 272 with respect to the base 266 in the first direction ($D_1$) and/or the second direction ($D_2$). Although the internal stop arrangement of FIG. 9 might be suitable for preventing excess rotational travel of the shaft 272 with respect to the base 266 in both the first and second directions ($D_1$, $D_2$), it will be appreciated that, for the reasons discussed above with respect to FIG. 8, this arrangement might in some circumstances only provide sufficient strength to prevent excess rotational travel of the shaft 272 in only one direction (e.g., the second direction $D_2$). A spring or other resilient device might also be associated with the control assembly 250 (e.g., inside the cavity 284 or external to the base 266) to facilitate return rotation of the control knob (e.g., in the second direction $D_2$) after its actuation by an operator (e.g., in the first direction $D_1$).

Figure 5:
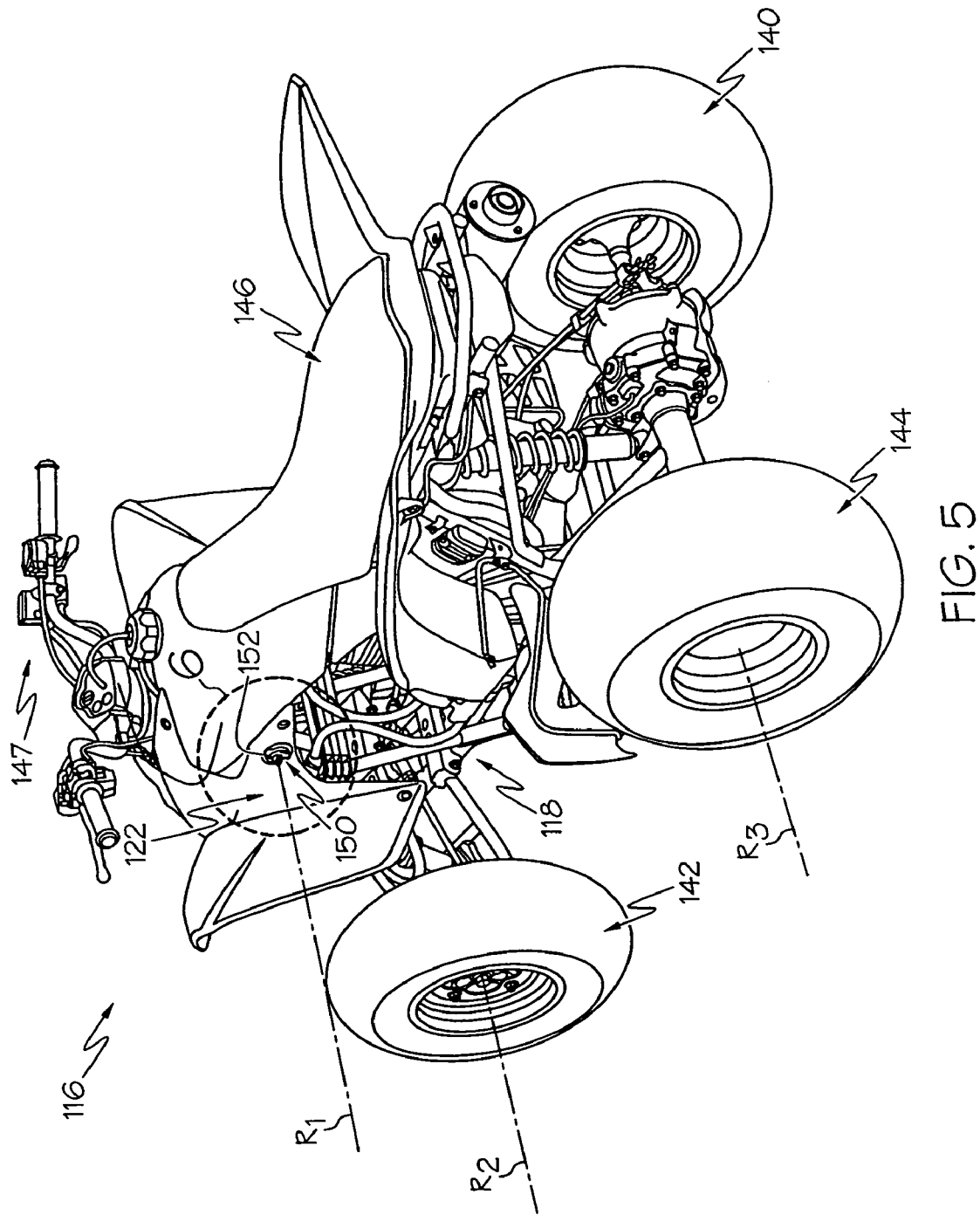
FIG. 5 is a rear perspective view of an ATV having a control assembly in accordance with another exemplary embodiment of the present invention.
Figure 6:
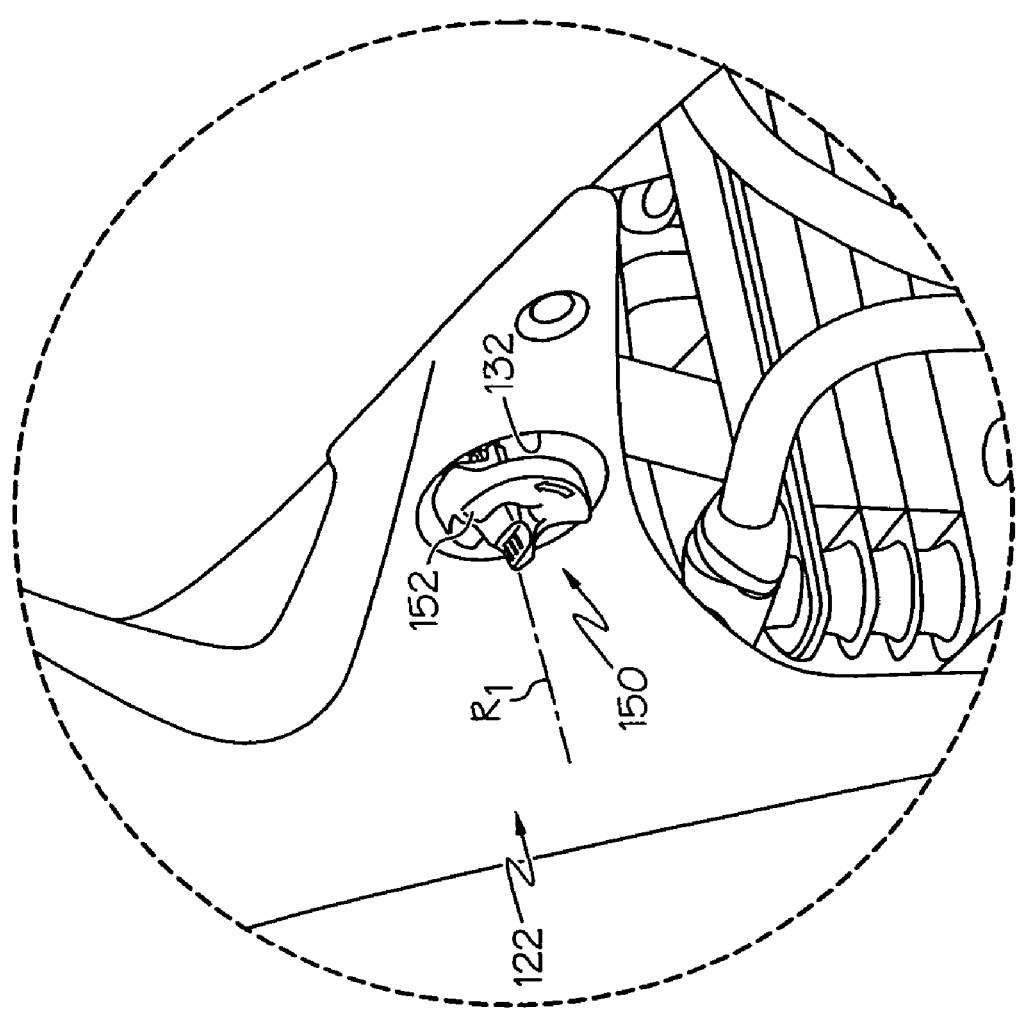
FIG. 6 is an enlarged view depicting a portion of the ATV of FIG. 5 including the control assembly.

Turning now to FIG. 5, another ATV 116 in accordance with the teachings of the present invention is depicted. The ATV 116 is shown to include a frame 118 and multiple body panels (e.g., body panel 122). The ATV 116 can include a rear right wheel 140, a front left wheel 142, a rear left wheel 144, and a front right wheel (not shown). The ATV 116 can also include a seat 146 and handlebars 147.

Furthermore, the ATV 116 can include a control assembly 150 having a control knob 152 with a rotational axis $R_1$. The portion of the ATV 116 including the control assembly 150 is more clearly depicted in FIG. 6. In particular, the control knob 152 is shown to protrude through an opening 132 in the body panel 122. In this configuration, an operator can readily locate and access the control knob 152 with his or her left hand during operation of the ATV 116.

Figure 7:
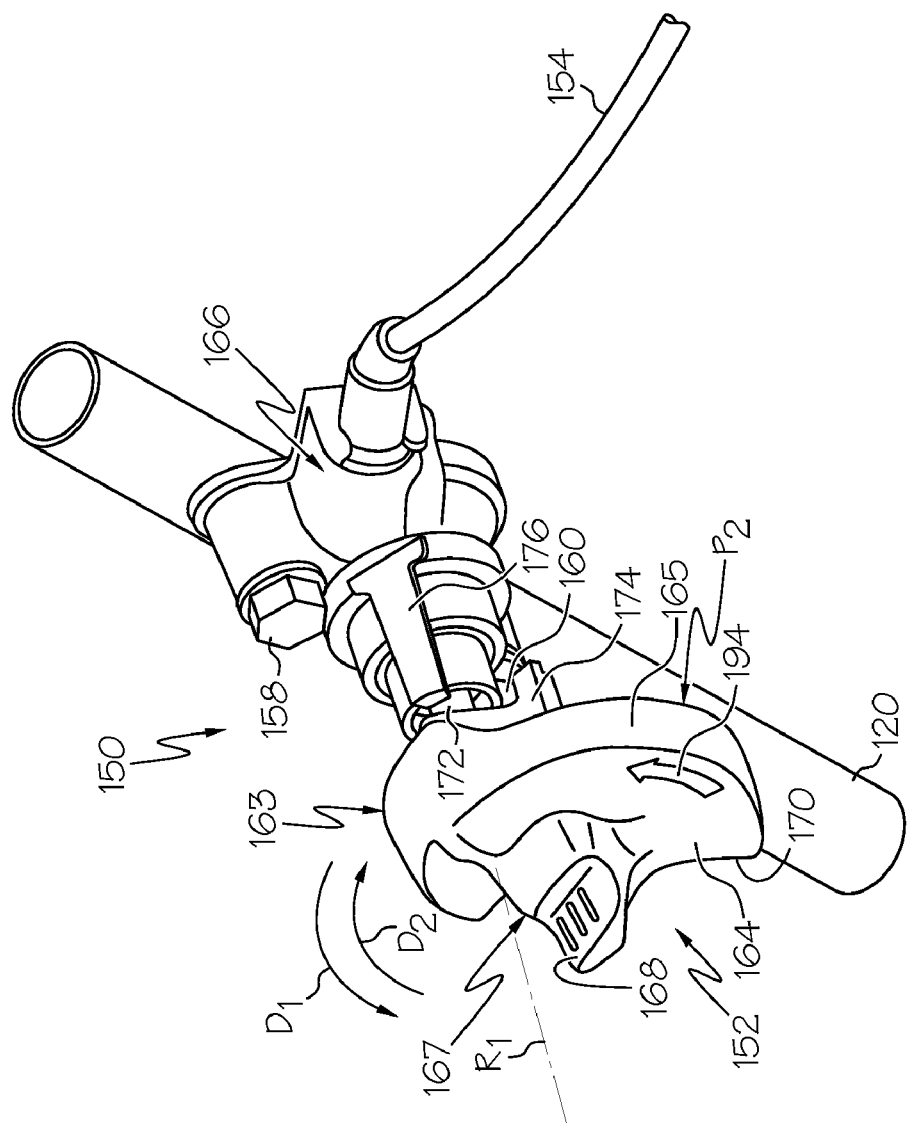
FIG. 7 is an enlarged perspective view of the control assembly attached to the frame of the ATV of FIGS. 5-6, wherein body panels of the ATV have been removed for clarity.

Turning now to FIG. 7, the control assembly 150 is depicted with body panels (e.g., 122) removed for clarity of illustration. In addition to the control knob 152, the control assembly 150 is shown to include a shaft 172 and a base 166. The base 166 is shown to be directly attached to a frame portion 120 of the frame 118 with bolts 158, 160. However, other fasteners and/or mechanical interface devices might additionally or alternatively be provided to facilitate this direct attachment. The control knob 152 is shown to include a protruding portion 167, which can include a thumb rest 168, can also include a finger pad 163. The finger pad 163 can include a generally outwardly facing surface 164, i.e., surface 164 can face generally away from ATV 116. Finger pad 163 can also include an edge surface 165 that is contiguous with the generally outwardly facing surface 164 and that defines a perimeter $P_2$ of finger pad 163. The protruding portion 167 can be integral with the finger pad 163 and can extend outwardly from the generally outwardly facing surface 164 of finger pad 163. The edge surface 165 can include a finger contact portion 170. An operator can place the thumb of his or her left hand upon the thumb rest 168 and can use his or her index and/or ring fingers to facilitate rotation of the control knob 152 in a first direction ($D_1$). The first direction ($D_1$) can be indicated to an operator by an arrow 194 and/or some other indicia, as discussed above.

The control knob 152 can be provided with a first stop 174, and the base 166 can be provided with a second stop 176. Together, these stops 174, 176 can prevent excessive rotation of the control knob 152 in a first direction ($D_1$) and/or a second direction ($D_2$). The control assembly 150 might also or alternatively be provided with an internal stop arrangement which might, for example, be provided within a cavity within the base 166, as discussed, for example, with respect to the control assembly 50 above. A cable 154 is shown to be attached to the base 166, whereby this cable 154 can lead to a reverse inhibitor system within the transmission of the ATV 116.

In one exemplary embodiment of the present invention, a control assembly can be attached to the ATV such its control knob has a rotational axis that is substantially parallel with the rotational axis of at least one of the ATV's driven wheels. For example, FIG. 5 depicts the control assembly 150 as being attached to the ATV 116 such that the rotational axis ($R_1$) of the control knob 152 is substantially parallel with the rotational axis (e.g., $R_2$, $R_3$) of at least one of the driven wheels (e.g., 140, 142, 144) of the ATV 116. In some circumstances, the rotational axis ($R_1$) of the control knob 152 can be substantially parallel with the rotational axis (e.g., $R_2$, $R_3$) of at least one of the driven wheels (e.g., 140, 142, 144) of the ATV 116 during virtually all aspects of operation of the ATV 116. However, the rotational axes (e.g., $R_2$, $R_3$) of the driven wheels (e.g., 140, 142, 144) might vary during steering of the ATV 116 and/or during travel of the ATV 116 over uneven terrain, in which circumstances the rotational axis ($R_1$) of the control knob 152 can be substantially parallel with the rotational axis (e.g., $R_2$, $R_3$) of at least one of the driven wheels (e.g., 140, 142, 144) of the ATV 116 during only some aspects of operation of the ATV 116. In either circumstance, the rotational axis ($R_1$) of the control knob 152 can be substantially directed outwardly from the side of the ATV 116, as opposed to being directed toward the operator of the ATV 116 (e.g., like the rotational axis of the handlebars 147 which is directed toward the operator). By having a rotational axis that is outwardly directed in this manner, the control knob 152 can be easily rotated by a single finger of an operator, but is nevertheless unlikely to be inadvertently rotated by the operator and/or debris.

By providing a control assembly attached indirectly or directly to the frame of an ATV (e.g., as shown in FIGS. 4 and 7), it will be appreciated that any body panels can be secured to the ATV (e.g., during manufacturing of the ATV) after the control assembly has been attached to the frame. In this manner, efficiencies can be achieved in the manufacturing process by not requiring the control assembly to be attached to any body panels and/or installed after body panels have been installed. Furthermore, by attaching one or more body panels to the frame of an ATV after the control assembly is attached to the frame, those body panels can cover or conceal at least part of the control assembly (e.g., the base 66 or 166) from operator view and/or access.

A control assembly in accordance with the teachings of the present invention might not be used to disable a reverse inhibitor system on an ATV. Rather, the control assembly might instead be provided to enable an operator to change gearing, lighting, differential action, braking qualities, engine operation, and/or any of a variety of other aspects involving ATV performance.

A control assembly in accordance with the teachings of the present invention might include an electrical actuator. The actuator might comprise a potentiometer, a rheostat, or a rotary contact switch (having two or more positions), for example. The actuator can be associated with the base of an exemplary control assembly, and can be coupled with a rotatable shaft and control knob of the control assembly. An electrical wire can be provided to connect with the electrical actuator, as well as with whatever device is being controlled with the control assembly (e.g., a reverse inhibitor system). The electrical wire can be provided in addition to or in lieu of a mechanical link (e.g., cable 54 shown in FIG. 8).

The foregoing description of exemplary embodiments and examples of the invention has been presented for purposes of illustration and description. It is not intended to be exhaustive or to limit the invention to the forms described. Numerous modifications are possible in light of the above-teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or exemplary embodiments set forth herein, but can be employed in any number of applications and equivalent devices by those of ordinary skill in the art. Rather it is hereby intended the scope of the invention be defined by the claims appended hereto.

What is claimed is:

1. An all terrain vehicle comprising:
   a frame;
   at least one driven wheel supported with respect to the frame and having a first rotational axis; and
   a control assembly comprising a control knob, a shaft, and a non-rotatable base, wherein the control knob is fixedly attached to the shaft and the shaft is rotatably attached to the base, the control knob comprises a finger pad and a first stop and the base comprises a second stop, wherein the first stop extends from the finger pad toward the base and the second stop extends from the base toward the finger pad, the first and second stops being configured to selectively contact each other during rotation of the control knob in a first direction with respect to the base to limit rotation of the control knob with respect to the base in the first direction; wherein
   the shaft comprises a first member and the base defines a cavity, the base having a second member disposed within the cavity, the cavity rotatably receiving at least a portion of the shaft such that the first and second members selectively contact each other within the cavity during rotation of the control knob in a second direction with respect to the base, the second direction being opposite from the first direction, to limit rotation of the control knob with respect to the base in the second direction.

2. The all terrain vehicle of claim 1 wherein the control knob has a second rotational axis substantially parallel with the first rotational axis.

3. The all terrain vehicle of claim 2 wherein the base is attached directly to the frame.

4. The all terrain vehicle of claim 1 further comprising a body panel that is attached to the frame and that covers at least part of the control assembly.

5. The all terrain vehicle of claim 1 further comprising a bracket attached directly to the frame, wherein the base is attached directly to the bracket.

6. The all terrain vehicle of claim 5 further comprising a body panel that is attached to the frame and that covers at least part of the control assembly.

7. The all terrain vehicle of claim 1 wherein:

the finger pad comprises a generally outwardly facing surface and an edge surface contiguous with the generally outwardly facing surface;

the edge surface defines a perimeter of the finger pad and comprises a finger contact portion;

the control knob further comprises a protrusion integral with the finger pad and extending outwardly away from the generally outwardly facing surface of the finger pad, the protrusion comprising a thumb rest, the control knob being configured to rotate in the first direction when pressure is applied to the finger contact portion of the edge surface of the finger pad by a single finger of an operator.

8. The all terrain vehicle of claim 1 wherein the control knob is spring-biased in the second direction with respect to the base, the second direction being opposite from the first direction.

9. The all terrain vehicle of claim 1 wherein the base is attached directly to the frame.

10. The all terrain vehicle of claim 1 further comprising a transmission attached to the frame and including a reverse inhibitor system, wherein the control knob is rotatable in the first direction to disable the reverse inhibitor system.

11. The all terrain vehicle of claim 1 wherein the first stop is spaced apart from the shaft.

* * * * *